United States Patent [19]

Cavitt et al.

[11] Patent Number: 4,724,253

[45] Date of Patent: Feb. 9, 1988

[54] ADDUCTS OF PARTIALLY HYDROLYZED EPOXY RESINS AND POLYAMINES

[75] Inventors: Michael B. Cavitt; Shari E. McMillan, both of Lake Jackson, Tex.

[73] Assignee: The Dow Chemical Company, Midland, Mich.

[21] Appl. No.: 874,325

[22] Filed: Jun. 13, 1986

[51] Int. Cl.[4] .......................... C08G 8/28; C08G 8/02; C08G 59/00

[52] U.S. Cl. .................................. 525/504; 528/123; 528/104; 528/98; 525/507

[58] Field of Search ................. 525/504, 507; 528/123, 528/104, 98

[56] References Cited

U.S. PATENT DOCUMENTS

| | | | |
|---|---|---|---|
| 3,632,836 | 1/1972 | Walker | 260/830 R |
| 3,787,508 | 1/1974 | Walker | 568/640 |
| 4,108,824 | 8/1978 | Dante | 528/123 |
| 4,113,684 | 9/1978 | Petrie | 260/29.2 EP |
| 4,269,742 | 5/1981 | Goeke et al. | 260/18 PN |
| 4,310,695 | 1/1982 | Dante | 564/445 |
| 4,316,003 | 2/1982 | Dante et al. | 528/111 |
| 4,340,713 | 7/1982 | Davis et al. | 528/89 |
| 4,348,505 | 9/1982 | Di Benedetto et al. | 525/504 |
| 4,358,577 | 11/1982 | McCrary et al. | 528/89 |
| 4,404,335 | 9/1983 | Cavitt | 523/454 |
| 4,457,800 | 7/1984 | Schure et al. | 156/307.3 |
| 4,525,542 | 6/1985 | De Gooyer | 525/484 |
| 4,530,948 | 7/1985 | Cavitt et al. | 523/454 |

*Primary Examiner*—Harold D. Anderson
*Assistant Examiner*—Dennis R. Daley

[57] ABSTRACT

Adducts are prepared from partially hydrolyzed epoxy resins having an average functionality of at least about 2.6 such as a partially hydrolyzed phenol-formaldehyde epoxy novolac resin and a polyamine such as diethylenetriamine. These adducts are useful in preparing low temperature curable epoxy resin compositions.

20 Claims, No Drawings

ADDUCTS OF PARTIALLY HYDROLYZED EPOXY RESINS AND POLYAMINES

BACKGROUND OF THE INVENTION

The present invention is directed to adducts of amine-containing materials and epoxy resins and to curable compositions containing same.

Adducts of polyamines and epoxy resins have been employed to cure epoxy resins as disclosed by Di Benedetto et al in U.S. Pat. No. 4,348,505. These adducts are useful in the preparation of room temperature curable coatings having superior properties. It would be advantageous to have a curing agent which can be employed in epoxy resin compositions which are capable of being cured at ambient conditions wherein the ambient temperature is below the average room temperature of about 25° C. The present invention provides an epoxy resin curing agent which can cure epoxy resins at temperatures below the normal ambient temperature of 25° C. but at temperatures above about −10° C.

SUMMARY OF THE INVENTION

One aspect of the present invention pertains to a composition which comprises the adduct of (1) at least one partially hydrolyzed epoxy resin having an average of at least about 2.6, preferably from about 2.8 to about 6, most preferably from about 3 to about 4 vicinal epoxide groups per molecule wherein from about 5 to about 20 percent of the epoxide groups have been hydrolyzed to the

group and (2) at least one material having at least two amine groups selected from primary amine groups, secondary amine groups or a combination thereof; wherein components (1) and (2) are employed in an amount which provides a ratio of epoxide equivalents per active amine hydrogen atoms such that the resultant adduct does not form a gel.

Another aspect of the present invention pertains to a curable composition which comprises (A) an adduct of (1) at least one partially hydrolyzed epoxy resin having an average of at least about 2.6, preferably from about 2.8 to about 6, most preferably from about 3 to about 4 vicinal epoxide groups per molecule wherein from about 5 to about 20 percent of the epoxide groups have been hydrolyzed to the

group and (2) at least one material having at least two amine groups selected from primary amine groups, secondary amine groups or a combination thereof wherein components (1) and (2) are employed in an amount which provides a ratio of epoxide equivalents per active amine hydrogen atom such that the resultant adduct does not form a gel and (B) at least one epoxy resin having an average of from at least about 2.6, preferably from about 2.8 to about 6, most preferably from about 3 to about 4, vicinal epoxide groups per molecule, preferably said epoxy resin has been partially hydrolyzed to the extent that from about 5% to about 20% of the epoxy groups have been hydrolyzed to the

group and wherein components (A) and (B) are present in quantities which provide a ratio of active amine hydrogen atoms contained in component (A) per epoxide equivalent contained in component (B) of from about 0.75:1 to about 2:1, preferably from about 0.85:1 to about 1.5:1, most preferably from about 0.9:1 to about 1.1:1.

The term active amine hydrogen atom means a hydrogen atom attached to a nitrogen atom which is reactive with an epoxide group.

Another aspect of the present invention pertains to a coating composition which comprises (I) from about 35 to about 90, preferably from about 40 to about 80, percent by weight of the combined weight of components (I) and (II) of the aforementioned curable composition and (II) from about 65 to about 10, preferably from about 60 to about 20 percent by weight of the combined weight of components (I) and (II) of a suitable solvent composition.

DETAILED DESCRIPTION OF THE INVENTION

The amine adducts of the present invention are prepared by reacting the amine-containing material with the partially hydrolyzed epoxy resin in the presence of a suitable solvent at a temperature and time sufficient to complete the reaction. Particularly suitable temperatures are from about 25° C. to about 60° C., preferably from about 35° C. to about 50° C. The time, of course, depends upon the temperature, but usually a time of from about 1 to about 10, preferably from about 4 to about 6 hours is suitable. Suitable solvents which can be employed to prepare the adducts include alkyl carboxylates, alcohols, hydrocarbons, glycol ethers, glycol ether acetates, combinations thereof and the like; with the proviso that at ambient curing temperatures of less than 25° C., the particular solvent employed has an evaporation rate suitable for forming an acceptable coating. Particularly suitable such solvents include, for example, methyl acetate, ethyl acetate, ethanol, butanol, toluene, xylene, methyl ether of dipropylene glycol, methyl ether of dipropylene glycol acetate, combinations thereof and the like. The solvent is employed in quantities of from 10 to about 65, preferably from about 20 to about 60, most preferably from about 20 to about 40 percent by weight based upon the weight of the partially hydrolyzed epoxy resin and the amine-containing material.

The partially hydrolyzed epoxy resin and the polyamine are employed in any quantity which does not produce a gel and wherein there remains in the reaction product a sufficient amount of active hydrogen atoms so that it will function as a curing agent for epoxy resins. However, the amounts cannot be such that the resultant product forms a gel. Also, the amount that can be employed without forming a gel will also depend upon the functionality of the epoxy resin. The greater the functionality of the epoxy resin, the lower the ratio of epoxy groups per active amine hydrogen atom that can be employed. For epoxy resins having an epoxy functionality of from about 2.6 to about 4, the ratio of epoxy equivalents per active amine hydrogen atom is from about 0.04:1 to about 0.2:1, preferably from about 0.06:1 to about 0.1:1, most preferably from about 0.07:1 to about 0.093:1. For epoxy resins having an average functionality greater than about 4, the ratio of epoxy equivalents per active amine hydrogen atom is from about 0.02:1 to about 0.06:1, preferably from about 0.024:1 to about 0.058:1, most preferably from about 0.03:1 to about 0.056:1.

Suitable partially hydrolyzed epoxy resin which can be employed herein include any epoxy resin having an average of at least about 2.6 vicinal epoxy groups per molecule including mixtures of epoxy resins having an average of less than 2.6 vicinal epoxy groups per molecule and epoxy resins having an average of more than 2.6 vicinal epoxy groups per molecule so long as the resultant mixture has an average of at least about 2.6 vicinal epoxy groups per molecule and of course provided that from about 5 to about 20 percent of the epoxy groups have been hydrolyzed. Particularly suitable epoxy resins which can be employed herein include those represented by the following formulas I, II, and III

(I)

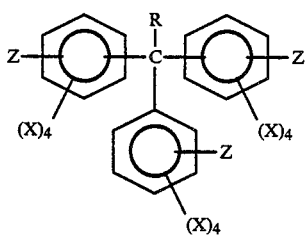

(II)

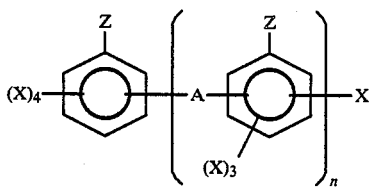

(III)

wherein each A is independently a divalent hydrocarbyl group having from 1 to about 10, preferably from about 1 to about 4, carbon atoms; each X is independently hydrogen, a hydrocarbyl group having from 1 to about 10, preferably from 1 to about 4, carbon atoms or a halogen, preferably chlorine or bromine; R is hydrogen or a hydrocarbyl group having from about 1 to about 10, preferably from 1 to about 4, carbon atoms; each Z is independently a group represented by the following formula IV or V

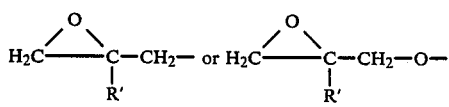

(IV)

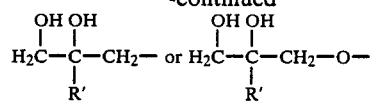

(V)

wherein each R' is independently hydrogen or a hydrocarbyl group having from 1 to about 4 carbon atoms and n has an average value of from about 1.6 to about 5, preferably from about 2 to about 3; and wherein from about 5 to about 20 percent of the Z groups are represented by formula V.

Suitable materials containing at least one primary or secondary amine group or a combination thereof include, for example, aliphatic amines, cycloaliphatic amines, heterocyclic saturated and unsaturated amines. Particularly suitable amines include, for example, ethylenediamine, trimethylene diamine, tetramethylenediamine, hexamethylenediamine, trimethyl hexamethylenediamine, 1,4-bis(aminoethyl)cyclohexane, 1,4-bis-(aminocyclohexyl)methane, isophorone diamine, diethanolamine, methylethanolamine, diaminodiphenylsulfone, polyalkylenepolyamines, such as for example, diethylenetriamine, triethylenetetramine, tetraethylenepentamine, combinations thereof and the like. Also suitable are the phenalkamines prepared from aliphatic amines, cycloaliphatic amines, heterocyclic saturated and unsaturated amines reacted with phenolic compounds such as phenol, alkylphenols such as methyl phenol, dimethylphenol, trimethylphenol, ethylphenol, diethylphenol, triethylphenol, combinations thereof and the like.

The compositions of the present invention can be employed in coatings, adhesives, flooring compositions and the like.

The curable epoxy resin compositions of the present invention can be modified to contain solvents, pigments, dyes, fillers, levelling agents, flow control agents, accelerators, fire retardant agents, modifiers, combinations thereof and the like. Suitable solvents include, for example, alcohols, alkyl carboxylates, hydrocarbons, glycol ethers, glycol ether acetates, combinations thereof and the like. Particularly suitable solvents include, for example, methyl acetate, ethyl acetate, ethanol, butanol, toluene, xylene, methyl ether of dipropylene glycol, methyl ether of dipropylene glycol acetate, combinations thereof and the like; with the proviso that when the application temperature is below about 25° C. the particular solvent or solvents employed have an evaporation rate so as to result in a suitable coating.

The following examples are illustrative of the present invention, but are not to be construed as to limiting the scope thereof in any manner.

The following tests were conducted on some of the cured compositions.

MEK DOUBLE RUBS

To the ball end of a 2 lb. ball pein hammer was attached a pad composed of ten plys of gauze material. The pad was saturated with methyl ethyl ketone (MEK) and then rubbed across a coated substrate. A constant back and forth motion was used allowing only the weight of the hammer to apply the force to the test panel. One double rub is equal to one back and forth movement. This movement was maintained until the film was marred and/or begins to be removed by the solvent.

PENCIL HARDNESS

This test is described in *Paint Testing Manual* by H. A. Gardner and G. G. Sward, 13th ed. (1972) pp. 283-284 which is incorporated herein by reference. The designations from poorest to best are: 6B, 5B, 4B, 3B, 2B, B, HB, F, H, 2H, 3H, 4H, 5H & 6H.

GLACIAL ACETIC ACID SPOT TEST

To a coated substrate was applied 2 ml of glacial acetic acid. The time at which delamination of the coating begins was recorded.

The following components were employed in the examples and comparative experiments.

Epoxy Resin A was an 80 percent by weight solution of a diglycidyl ether of bisphenol A having an epoxide equivalent weight (EEW) of about 188.6 in ethyl acetate. The 188.6 EEW was based on neat resin without solvent. The solution had an EEW of about 235.75.

Epoxy Resin B was an 80 percent by weight solution of a phenol-formaldehyde novolac epoxy resin having an average epoxide functionality of about 3.6 and an an EEW of about 177 in ethyl acetate. The 177 EEW was based on neat resin without solvent. The solution had an EEW of about 221.25.

Epoxy Resin C was an 80 percent by weight solution of a phenol-formaldehyde novolac epoxy resin having an average epoxide functionality of 3.3, an EEW of about 205.9 and an alpha glycol content of 1.86 weight percent in ethyl acetate. The 205.9 EEW was based on neat resin without solvent. The solution had an EEW of about 257.375. The alpha glycol content corresponds to a degree of hydrolysis of the epoxy groups of about 12.03 percent of the original epoxy groups prior to hydrolysis.

Epoxy Resin D was an 80 percent by weight solution of a phenol-formaldehyde novolac epoxy resin having an average epoxide functionality of about 5.5 and an EEW of about 211.3 in ethyl acetate. The 211.3 EEW was based on neat resin without solvent. The solution had an EEW of about 264.125. The degree of hydrolysis of the epoxy groups is about 11.3 percent of the original epoxy groups prior to hydrolysis.

Amine A was diethylenetriamine having an amine hydrogen equivalent weight (AHEW) of 20.6.

Amine B was 2-aminoethyl piperazine having an AHEW of 43.1.

Amine C was a phenalkamine having an AHEW of 75 commercially available from the Cardolite Corporation as CARDOLITE TM NC-540.

COMPARATIVE EXPERIMENT A

A 500 ml flask was charged with 139.1 g (1.35 mole, 6.75 amine hydrogen equiv.) of Amine A and 34.8 g (0.395 mole) of ethyl acetate and heated to 45° C. whereupon 147.11 g (0.624 epoxy equivalent) of Epoxy Resin A was added over a period of 2.65 hours (9540 s). The mixture was digested for 2 hours (7200 s) at 45° C. The resultant straw colored viscous liquid product had an (AHEW) of 57.1.

COMPARATIVE EXPERIMENT B

A 500 ml flask was charged with 139 g (1.35 mole, 6.75 amine hydrogen equiv.) of Amine A and 34.8 g (0.395 mole) of ethyl acetate and heated to 45° C. whereupon 137.55 g (0.622 epoxy equiv.) of Epoxy Resin B was added over a period of 2.78 hours (10,008 s). The mixture was digested for 2 hours (7200 s) at 45° C. The resultant straw colored viscous liquid product had an AHEW of 53.9.

EXAMPLE 1

A 500 ml flask was charged with 128.8 g (1.25 mole, 6.25 amine hydrogen equiv.) of Amine A and 32.2 g (0.365 mole) of ethyl acetate and heated to 45° C. whereupon 148.57 g (0.577 epoxy equiv.) of Epoxy Resin C was added over a period of 2.75 hours (9900 s). The mixture was digested for 2 hours (7200 s) at 45° C. The resultant straw colored viscous liquid product had an AHEW of 54.1.

EXAMPLE 2

A 500 ml flask was charged with 144.2 g (1.4 moles, 7 amine hydrogen equiv.) of Amine A and 36.05 g (0.409 mole) of ethyl acetate and heated to 45° C. whereupon 139.74 g (0.543 epoxy equiv.) of Epoxy Resin C was added over a period of 2.93 hours (10,548 s). The mixture was digested for 2 hours (7200 s) at 45° C. The resultant straw colored viscous liquid product had an AHEW of 48.7.

EXAMPLE 3

A 500 ml flask was charged with 129 g (1.032 moles, 2.99 amine hydrogen equiv.) of Amine B and 32.3 g (0.366 mole) of ethyl acetate and heated to 45° C. whereupon 154.58 g (0.601 epoxy equiv.) of Epoxy Resin C was added over a period of 2.9 hours (10,440 s). The mixture was digested for 4 hours (14,400 s) at 45° C. The resultant straw colored viscous liquid product had an AHEW of 101.4.

EXAMPLE 4

A 500 ml flask was charged with 30 g (0.149 mole, 0.4 amine hydrogen equiv.) of Amine C and 7.5 g (0.085 mole) of ethyl acetate and heated to 45° C. whereupon 7.2 g (0.028 epoxy equiv.) of Epoxy Resin C was added over a period of 1 hour (7200 s). The mixture was digested for 0.5 hour (7200 s) at 45° C. The resultant orange-red colored viscuous liquid product had an AHEW of 119.9.

EXAMPLE 5

A 500 ml flask was charged with 72.1 g (0.7 mole, 3.5 amine hydrogen equiv.) of Amine A and 18.0 g (0.204 mole) of ethyl acetate and heated to 45° C. whereupon 45.8 g (0.173 epoxy equiv.) of Epoxy Resin D was added over a period of 1.12 hours (4032 s). The mixture was digested for 30 minutes (1800 s) at 45° C. The resultant straw colored viscous liquid product had a calculated AHEW of 40.86.

Coatings were prepared from the amine adducts as prepared above as well as some of the amines themselves and an epoxy resin. The coating compositions were applied to 4 in.×12 in.×20 gauge (101.6 mm×304.8 mm×0.63 mm) BONDERITE TM 40 treated cold rolled steel panels. Immediately after applying the coating, the panels were placed into a refrigerator that was controlled at a temperature of 0° C. The panels were kept in the 0° C. refrigerator for 7 days (604800 s). After this period, the panels were tested. The formulations and test results are given in the Table.

TABLE

| COMPONENT AND PROPERTY | SAMPLE NUMBER | | | | |
|---|---|---|---|---|---|
| | A* | B* | C* | D* | E* |
| AMINE, Type/g | A/2.48 | A/2.5 | A/2.52 | CE[1]A/5.04 | CEB/4.99 |
| EPOXY, Type/g | A/22.89 | B/21.45 | C/24.99 | A/22.48 | B/21.75 |
| PENCIL HARDNESS | NC[3] | NC | 2B | 6B | 6B |
| MEK DOUBLE RUBS | 3 | 3 | 3 | 3 | 3 |
| ACETIC ACID SPOT TEST | NT[4] | NT | 390[5] | 120[5] | 81[5] |

| COMPONENT AND PROPERTY | SAMPLE NUMBER | | | | | |
|---|---|---|---|---|---|---|
| | F | G | H | I* | J | K |
| AMINE, Type/g | EX[2]1/5.02 | EX2/5.03 | EX3/10.02 | C/10.16 | EX4/10.03 | EX5/2.97 |
| EPOXY, Type/g | C/23.62 | C/25.81 | C/12.09 | C/27.62 | C/24.4 | D/19.37 |
| PENCIL HARDNESS | 6B | 6B | 6B | 2B | 2B | 6B |
| MEK DOUBLE RUBS | 38 | 6 | 3 | 19 | >100 | >100 |
| ACETIC ACID SPOT TEST | 270 | 53 | 115 | 83 | >1800 | 1254 |

*Not an example of the present invention.
[1]CE means comparative experiment.
[2]EX means example.
[3]NC means not cured.
[4]NT means not tested.
[5]Coating dissolved in acetic acid rather than the coating delaminating.

We claim:
1. A composition which comprises the adduct of (1) at least one partially hydrolyzed epoxy resin having an average of at least about 2.6 vicinal epoxide groups per molecule wherein from about 5 to about 20 percent of the epoxide groups have been hydrolyzed to the

group and (2) at least one material having at least two amine groups selected from primary amine groups, secondary amine groups or a combination thereof; wherein components 1 and 2 are employed in an amount which provides a ratio of epoxide equivalents per active amine hydrogen atoms such that the resultant adduct does not form a gel.

2. A composition of claim 1 wherein components (1) and (2) are employed in quantities such that when component (1) has an average epoxy functionality of from about 2.6 to about 4, the ratio of epoxy equivalents per active amine hydrogen atom is from about 0.04:1 to about 0.2:1 and when component (1) has an average functionality greater than about 4, the ratio of epoxy equivalents per active amine hydrogen atom is from about 0.02:1 to about 0.06:1.

3. A composition of claim 2 wherein (i) component (1) is a partially hydrolyzed epoxy resin represented by the following formulas I, II or III

(I)

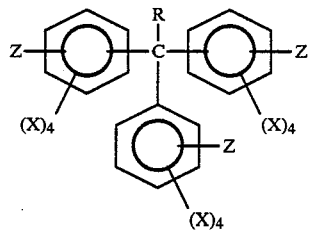

(II)

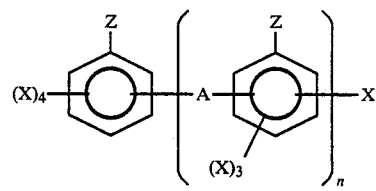

(III)

wherein each A is independently a divalent hydrocarbyl group having from 1 to about 10; each X is independently hydrogen, a hydrocarbyl group having from 1 to about 10 carbon atoms or a halogen; R is hydrogen or a hydrocarbyl group having from about 1 to about 10 carbon atoms; each Z is independently a group represented by the following formula IV or V

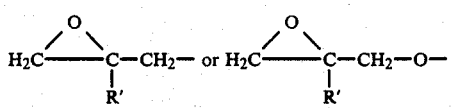

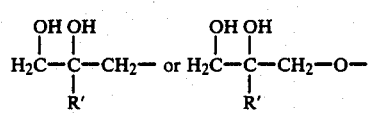

wherein each R' is independently hydrogen or a hydrocarbyl group having from 1 to about 4 carbon atoms and n has an average value of from about 1.6 to about 5; and wherein from about 5 to about 20 percent of the Z groups are represented by formula V; (ii) components (1) and (2) are employed in quantities such that when component (1) has an epoxy functionality of from about 2.8 to about 4, the ratio of epoxy equivalents per active amine hydrogen atom is from about 0.06:1 to about 0.1:1 and when component (1) has an average functionality greater than about 4, the ratio of epoxy equivalents per active amine hydrogen atom is from about 0.024:1 to about 0.058:1; (iii) component (2) is a polymethylenediamine, a polyalkylenepolyamine or a phenalkamine and (iv) the composition contains a solvent in an amount of from 10 to about 65 percent by weight of components (1) and (2).

4. A composition of claim 3 wherein (i) components (1) and (2) are employed in quantities such that when component (1) has an average epoxy functionality of from about 2.8 to about 4, the ratio of epoxy equivalents per active amine hydrogen atom is from about 0.07:1 to about 0.093:1 and when component (1) has an average epoxy functionality greater than about 4, the ratio of epoxy equivalents per active amine hydrogen atom is from about 0.03:1 to about 0.056:1 and (ii) R has from about 1 to about 4 carbon atoms, R' is hydrogen and n has an average value of from about 2 to about 3.

5. A composition of claim 4 wherein (i) component (1) is represented by formula III wherein each A is a —CH$_2$— group and each X is hydrogen and (ii) component (2) is diethylenetriamine, 2-aminoethyl piperazine, a phenalkamine or a combination thereof.

6. A curable composition which comprises (A) an adduct of (1) at least one partially hydrolyzed epoxy resin having an average of at least about 2.6 vicinal epoxide groups per molecule wherein from about 5 to about 20 percent of the epoxide groups have been hydrolyzed to the

group and (2) at least one material having at least two amine groups selected from primary amine groups, secondary amine groups or a combination thereof wherein components (1) and (2) are employed in an amount which provides a ratio of epoxide equivalents per active amine hydrogen atom such that the resultant adduct does not form a gel and (B) at least one epoxy resin having an average of from at least about 2.6, vicinal epoxide groups per molecule and wherein components (A) and (B) are present in quantities which provide a ratio of active amine hydrogen atoms contained in component (A) per epoxide equivalent contained in component (B) of from about 0.75:1 to about 2:1.

7. A composition of claim 6 wherein components (A-1) and (A-2) are employed in quantities such that when component (A-1) has an average epoxy functionality of from about 2.6 to about 4, the ratio of epoxy equivalents per active amine hydrogen atom is from about 0.04:1 to about 0.2:1 and when component (A-1) has an average epoxy functionality greater than about 4, the ratio of epoxy equivalents per active amine hydrogen atom is from about 0.02:1 to about 0.06:1.

8. A composition of claim 7 wherein (i) components (A-1) and (B) are independently a partially hydrolyzed epoxy resin represented by the following formulas I, II or III

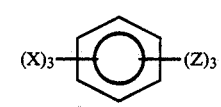

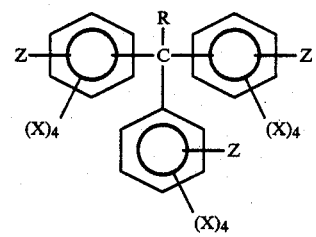

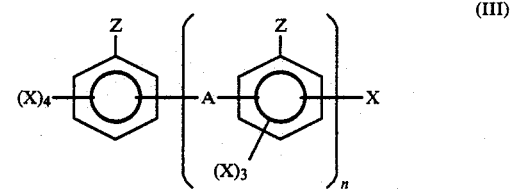

wherein each A is independently a divalent hydrocarbyl group having from 1 to about 10; each X is independently hydrogen, a hydrocarbyl group having from 1 to about 10 carbon atoms or a halogen; R is hydrogen or a hydrocarbyl group having from about 1 to about 10 carbon atoms; each Z is independently a group represented by the following formula IV or V

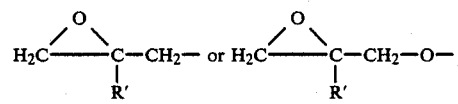

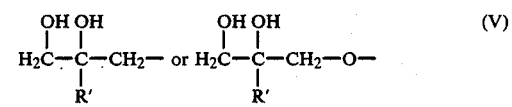

wherein each R' is independently hydrogen or a hydrocarbyl group having from 1 to about 4 carbon atoms and n has an average value of from about 1.6 to about 5; and wherein from about 5 to about 20 percent of the Z groups are represented by formula V; (ii) components (A-1) and (A-2) are employed in quantities such that when component (A-1) has an average epoxy functionality of from about 2.8 to about 4, the ratio of epoxy equivalents per active amine hydrogen atom is from about 0.06:1 to about 0.1:1 and when component (A-1)

has an average epoxy functionality greater than about 4, the ratio of epoxy equivalents per active amine hydrogen atom is from about 0.024:1 to about 0.058:1; (iii) component (A-2) is a polymethylenediamine, a polyalkylenepolyamine or a phenalkamine; (iv) the composition contains a solvent in an amount of from 10 to about 65 percent by weight of components (A-1) and (A-2) and (v) components (A) and (B) are present in quantities which provide a ratio of active amine hydrogen atoms contained in component (A) per epoxide equivalent contained in component (B) of from about 0.85:1 to about 1.5:1.

9. A composition of claim 8 wherein (i) components (A-1) and (A-2) are employed in quantities such that when component (A-1) has an average epoxy functionality of from about 2.8 to about 4, the ratio of epoxy equivalents per active amine hydrogen atom is from about 0.07:1 to about 0.093:1 and when component (A-1) has an average epoxy functionality greater than about 4, the ratio of epoxy equivalents per active amine hydrogen atom is from about 0.03:1 to about 0.056:1; (ii) R has from about 1 to about 4 carbon atoms, R' is hydrogen and n has an average value of from about 2 to about 3; (iii) components (A) and (B) are present in quantities which provide a ratio of active amine hydrogen atoms contained in component (A) per epoxide equivalent contained in component (B) of from about 0.9:1 to about 1.1:1 and (iv) the composition contains a solvent in the amount of from about 10 to about 65 percent by weight of component (A-1).

10. A composition of claim 9 wherein (i) component (A-1) is represented by formula III wherein each A is a —$CH_2$— group and each X is hydrogen; (ii) component (A-2) is diethylenetriamine, 2-aminoethyl piperazine, a phenalkamine or a combination thereof and component (B) is represented by formula III wherein each A is a —$CH_2$— group and each X is hydrogen.

11. A coating composition which comprises (I) from about 35 to about 90 percent by weight of the combined weight of components (I) and (II) of a composition of claim 6 and (II) from about 65 to about 10 percent by weight of the combined weight of components (I) and (II) of a suitable solvent composition.

12. A coating composition of claim 11 wherein component (I) is present in an amount of from about 40 to about 80 percent by weight of the combined weight of components (I) and (II) and component (II) is present in an amount of from about 60 to about 20 percent by weight of the combined weight of components (I) and (II).

13. A coating composition which comprises (I) from about 35 to about 90 percent by weight of the combined weight of components (I) and (II) of a composition of claim 7 and (II) from about 65 to about 10 percent by weight percent of the combined weight of components (I) and (II) of a suitable solvent composition.

14. A coating composition of claim 13 wherein component (I) is present in an amount of from about 40 to about 80 percent by weight of the combined weight of components (I) and (II) and component (II) is present in an amount of from about 60 to about 20 percent by weight of the combined weight of components (I) and (II).

15. A coating composition which comprises (I) from about 35 to about 90 percent by weight of the combined weight of components (I) and (II) of a composition of claim 8 and (II) from about 65 to about 10 percent by weight percent of the combined weight of components (I) and (II) of a suitable solvent composition.

16. A coating composition of claim 15 wherein component (I) is present in an amount of from about 40 to about 80 percent by weight of the combined weight of components (I) and (II) and component (II) is present in an amount of from about 60 to about 20 percent by weight of the combined weight of components (I) and (II).

17. A coating composition which comprises (I) from about 35 to about 90 percent by weight of the combined weight of components (I) and (II) of a composition of claim 9 and (II) from about 65 to about 10 percent by weight percent of the combined weight of components (I) and (II) of a suitable solvent composition.

18. A coating composition of claim 17 wherein component (I) is present in an amount of from about 40 to about 80 percent by weight of the combined weight of components (I) and (II) and component (II) is present in an amount of from about 60 to about 20 percent by weight of the combined weight of components (I) and (II).

19. A coating composition which comprises (I) from about 35 to about 90 percent by weight of the combined weight of components (I) and (II) of a composition of claim 10 and (II) from about 65 to about 10 percent by weight percent of the combined weight of components (I) and (II) of a suitable solvent composition.

20. A coating composition of claim 19 wherein component (I) is present in an amount of from about 40 to about 80 percent by weight of the combined weight of components (I) and (II) and component (II) is present in an amount of from about 60 to about 20 percent by weight of the combined weight of components (I) and (II).

* * * * *